US012639668B1

(12) United States Patent
Zaitzeff et al.

(10) Patent No.: US 12,639,668 B1
(45) Date of Patent: May 26, 2026

(54) CIRCUIT BOARD ANALYSIS AND BILL OF MATERIALS GENERATION

(71) Applicant: Two Six Labs, LLC, Arlington, VA (US)

(72) Inventors: Alexander Zaitzeff, Arlington, VA (US); Austin Fletcher, Keego Harbor, MI (US)

(73) Assignee: Two Six Labs, LLC, Arlington, VA (US)

( * ) Notice: Subject to any disclaimer, the term of this patent is extended or adjusted under 35 U.S.C. 154(b) by 122 days.

(21) Appl. No.: 18/402,207

(22) Filed: Jan. 2, 2024

(51) Int. Cl.
*G06Q 10/0875* (2023.01)
*G06F 16/583* (2019.01)
*G06F 18/22* (2023.01)

(52) U.S. Cl.
CPC ..... *G06Q 10/0875* (2013.01); *G06F 16/5846* (2019.01); *G06F 18/22* (2023.01)

(58) Field of Classification Search
CPC .. G06Q 10/0875; G06F 16/5846; G06F 18/22
See application file for complete search history.

(56) References Cited

U.S. PATENT DOCUMENTS

| | | | | |
|---|---|---|---|---|
| 9,165,186 | B1 * | 10/2015 | Ramos ................. | G06V 30/413 |
| 11,308,605 | B2 * | 4/2022 | Asadi-Zanjani .......... | G06T 7/50 |
| 12,217,170 | B2 * | 2/2025 | George .................... | G06N 3/08 |
| 2012/0177297 | A1 * | 7/2012 | Everingham .......... | G06V 20/62 |
| | | | | 382/229 |

* cited by examiner

*Primary Examiner* — Garcia Ade

(74) *Attorney, Agent, or Firm* — Armis IP Law, LLC

(57) ABSTRACT

A circuit board analysis system receives an image of a circuit implementation such as a printed circuit board (PCB), and renders a list of components, part numbers and vendors, referred to as a Bill of Materials (BOM) cataloging the constituent components and placement on the board. A scanning of the PCB image yields placement and identification of components, and textual recognition of the PCB substrate board identifies designators indicative of the location and connections of the components. Indica or markings on individual components aids component classification and identification, and a BOM listing components and designators included on the PCB is rendered.

20 Claims, 4 Drawing Sheets

CIRCUIT BOARD ANALYSIS AND BILL OF MATERIALS GENERATION

STATEMENT REGARDING FEDERALLY SPONSORED RESEARCH AND DEVELOPMENT

This invention was developed, at least in part, with U.S. Government Support under contract No. HR00112190029, awarded by Defense Advanced Research Projects Agency (DARPA). The Government has certain rights in the Invention.

BACKGROUND

Circuit board reverse engineering is a time consuming and sometimes imprecise task. Printed circuit boards (PCBs), schematic circuit diagrams and other specifications may be sought for origin and operation. Corporate acquisitions, forensic analysis and discarded/abandoned hardware represent potential sources of circuits that may benefit from an ability to reverse engineer and identify the circuit components and connections.

SUMMARY

A circuit board analysis system receives an image of a circuit implementation such as a printed circuit board (PCB), and renders a list of components, part numbers and vendors, referred to as a Bill of Materials (BOM) cataloging the constituent components and placement on the board. A scanning of the PCB image yields placement and identification of components, and textual recognition of the PCB substrate board identifies designators indicative of the location and connections of the components. Indica or markings on individual components aids component classification and identification, and a BOM listing components and designators included on the PCB is rendered.

Configurations herein are based, in part, on the observation that PCBs are often employed in electronics, computing devices, appliances, tactical hardware, and any electrical circuit deployed in an industrial or consumer appliance. PCBs provide an effective modular deployment for electronic aspects of guidance, control and/or feedback in a mass produced manner. Once deployed, repair, maintenance and/ or recycling of PCBs may seek to reverse engineer or otherwise identify components on a deployed PCB. Unfortunately, conventional approaches to reverse engineering and manipulation of PCBs suffers from the shortcoming of a myriad of sources of PCBs and constituent components from which the PCBs may be manufactured. Further, as PCBs age, vendors may no longer produce or support the products. Accordingly, configurations herein substantially overcome the shortcoming of conventional PCB reverse engineering and deconstruction by providing a bill of materials generation tool and application which receives an image of a PCB, and extracts constituent components and identification, along with designators silkscreened onto the PCBs (boards) themselves, and generates the BOM through matching of components, their board locations, and indicia and part numbers on the components for generating a corresponding BOM.

In further detail, configurations herein analyze a circuit representation such as a PCB for generating a BOM, by receiving an image of a circuit, and scanning the image for identifying objects indicative of circuit components. The analysis logic then scans the image for identifying labels of the circuit components, often referred to as designators, and matches the identified objects with a corresponding label. A list of materials is generated including a set of entries having, for each circuit component of the circuit components, a type of the circuit component and the respective corresponding label, and a rendering device is invoked for rendering the generated list of materials.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example of the disclosed system, method and apparatus for receiving a circuit board rendering such as a photographic image of a PCB, and outputting a BOM is shown below. The disclosed system includes an example application and interaction with several databases and models for matching or predicting data items computed for the resulting BOM.

Figure 1:
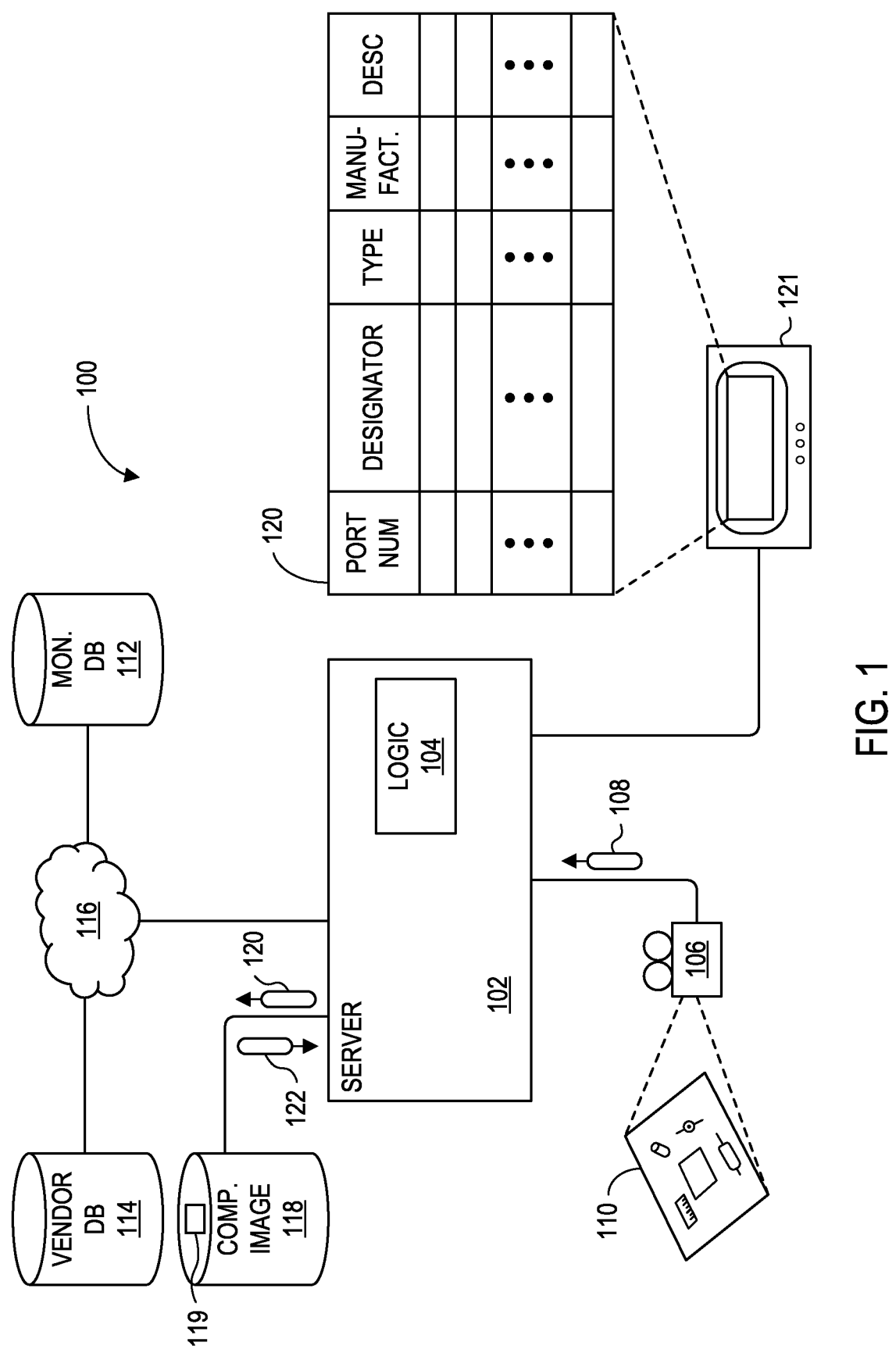
FIG. 1 is a context diagram of a circuit analysis environment suitable for use with configurations herein.

FIG. 1 is a context diagram of a circuit analysis environment 100 suitable for use with configurations herein. Referring to FIG. 1, the disclosed approach may be implemented on a server 102 system, computer, or other suitable processor based device for receiving, launching and executing an application or program for performing the disclosed approach. The approach is implemented in application logic 104 encoded in the server 102, and is executed in conjunction with a camera 106, scanner or other suitable image gathering device for receiving an image 108 of a PCB under analysis 110. An interface to a manufacturer database 112, and/or a vendor database 114 may be accessed by any suitable network connection, including as a public access network 116 such as the Internet. The application logic 104 performs an analysis and deconstruction of the PCB 110 for rendering a BOM 120 on a rendering device 121 such as a display or output file.

Printed circuit boards (PCBs) often form the core of electronic devices, providing the foundation for their functionality. Configurations herein demonstrate reverse engineering tools and a stepwise approach that generates a bill of materials (BOM) from a hardware image of a PCB. By leveraging advanced image processing and component recognition algorithms, the server 102 and logic 104 therein facilitate efficient and accurate analysis of PCBs, enabling a wide range of uses for the BOM resulting from reverse engineering the PCB.

In conventional approaches, reverse engineering of PCBs involved meticulous manual examination, component identification, and manual entry of components into a BOM by a subject matter expert. Due to the substantial savings and time reduction in increased efficiency, there have been attempts to automate this process. Conventional tools have focused on the components on the boards for identification. In contrast to conventional approaches, configurations herein utilize designators on the PCB, typically represented as silkscreen text on the board, and a learned and computed association to corresponding components based on a distance metric.

Configurations herein analyze a circuit representation for generating a list of materials thereon, by receiving an image of a circuit, and scanning the image for identifying objects indicative of circuit components. Through the approach disclosed below, the computer 102 determines, using scanned information such as the part number, designator, and a graphical indicia on the components, a bill of materials for the board including, for each component, a country of manufacture, a vendor, a cost, and a description.

Automation of the reverse engineering and the resulting BOM has a plethora of uses:

Counterfeit Detection: The proliferation of counterfeit electronic components poses significant challenges for manufacturers. The BOM generated from our tool can be compared to the given BOM in the documentation. By flagging any discrepancies or deviations, manufacturers can investigate the differences.

Legacy Product Reproduction: Reverse engineering tools with BOM generation capabilities are particularly useful for reproducing legacy products when original design documentation may be unavailable or incomplete. By analyzing the PCB and generating an accurate BOM, manufacturers can recreate older electronic devices or replace obsolete components with modern equivalents, extending the life cycle of the product.

Identification of PCB: The application can generate a BOM for an unknown PCB which can be compared with a database of known designs. The database can include other hardware PCB images and even other modes of PCB documentation such as schematics.

Intellectual Property Protection: On a similar note companies can use the disclosed approach to identify the similarities between an unknown design and a database of their designs. Companies can identify potential infringement cases and take legal action to protect their intellectual property rights.

Academic and Research Purposes: Reverse engineering tools with BOM generation can benefit academic institutions and researchers by facilitating the analysis of electronic devices for educational or investigative purposes. Students and researchers can study the construction, performance, and interactions of various components without having to do the tedious process of manually labeling the printed circuit board themselves.

Figure 2:
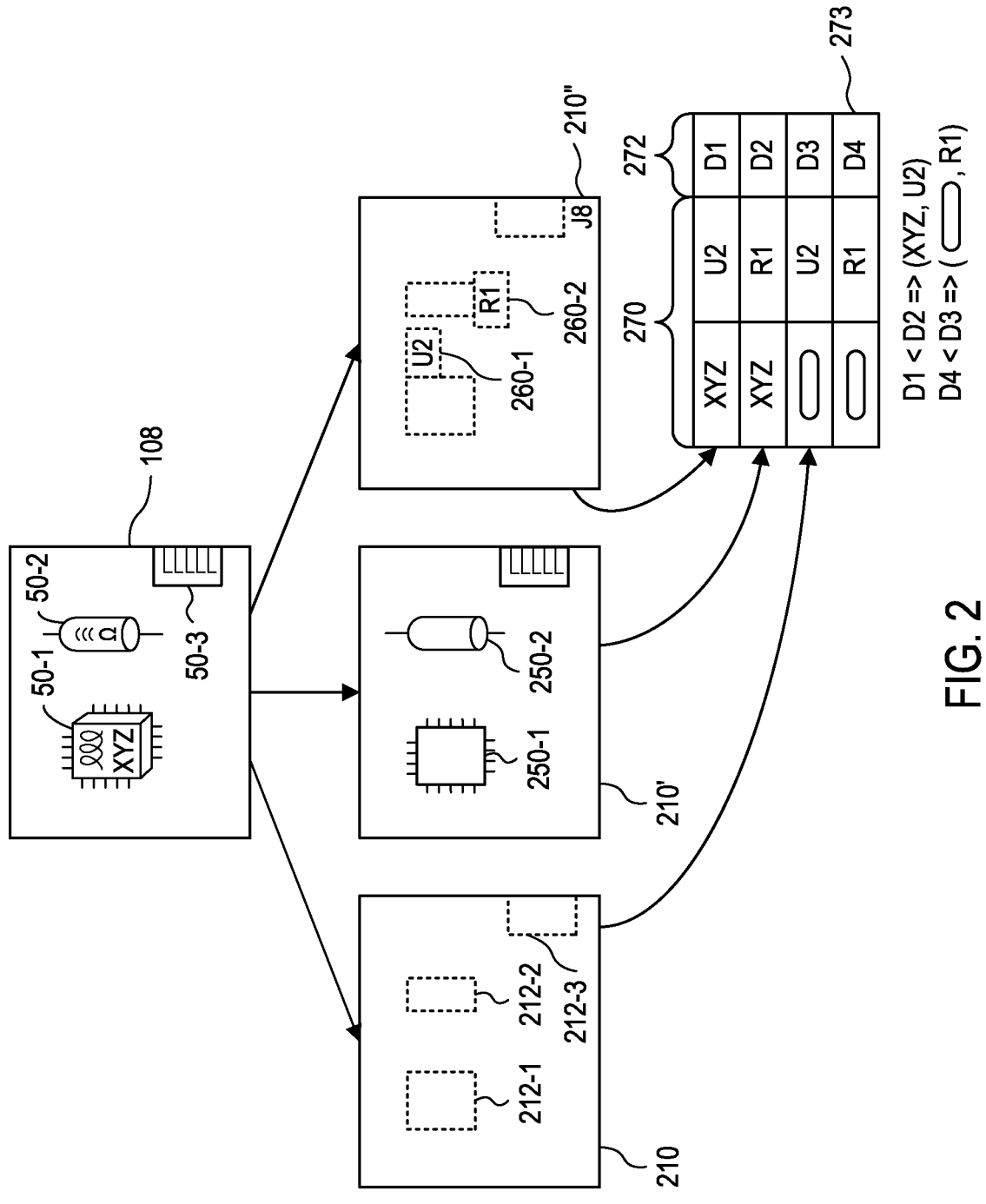
FIG. 2 is a data flow diagram of object extraction from an image in the environment of FIG. 1.

FIG. 2 is a data flow diagram of object extraction from an image in the environment of FIG. 1. Referring to FIGS. 1 and 2, the camera 106 is employed for receiving and scanning the image 108 of the PCB 110. One or multiple scans of the image 108 may be performed for retrieving data items from the scan 108. At least 3 types of data items are retrieved and analyzed, including object regions 210, components 210', and designators 210". The logic 104 scans the image for identifying objects 212-1, 212-2 and 212-3 (212 generally) indicative of circuit components 50-1 . . . 50-3 (50 generally), shown in an object scan 210. Each object 212 occupies a region on the board 110. For each object 212, the logic 104 identifies a position and an area, where the area is indicative of a region occupied by the circuit component 50 and the position being indicative of a location of the region relative to regions corresponding to other components. The planar area of the circuit board 110, as defined by image 108, is represented by a Cartesian plane or similar representation for the location and area (region) occupied by each component.

For each object 212 identified in a region, a matching is performed with a component repository 118 for identifying a component type based on visual appearance, using a model of 119 of component images. The image of the component 120 based on the extracted component is analyzed/matched with the component repository 118, and a component type 122 returned.

In the example of FIG. 1, component 50-1 is an IC (integrated circuit), component 50-2 is a resistor, and component 50-3 is a connector, defined by a type of jack. The jack is an interface component which is cataloged separately, discussed in FIG. 3 below. Standard component types are encoded into the component repository 118 based on industry standards. This pass employs object detection for labeling the components, as shown in component scan 210' Some of the more common component types are integrated circuits, resistors, capacitors, transistors, diodes, transformers, crystals, buttons, switches as well as other components found on a board. Insufficient certainty will accommodate an unknown type and render such a label to the component. The result yields a type of IC 250-1 for component 50-1, and resistor 250-2 for component 50-2. A typical board may have many components; FIG. 2 is intended as an example.

A circuit board typically has designators printed on the board, typically by silk-screening. The designators label the position and type of each component. Each component may or may not also have alphanumeric indicia or manufacturer specific logos (i.e. trademarks). In particular, active components such as ICs often have alphanumeric information thereon. Other components mar or may not have alphanumeric characters printed therein. The shape and appearance of each component is also matched by the model 119 in the repository. For example, resistors often have colored stripes for labeling a resistance value.

A successive pass 210" results from detecting, for each circuit component 250, designators on the circuit board referring to respective circuit components 50. It then detects, in the image 108, textual representations, and determining whether the textual representations are designators based on whether they appear in the object 212 region occupied by a circuit component. Textual features outside the regions occupied by components objects 212 are derived to be labels 260-1, 260-2 (260 generally) or designators, silkscreened on the board 110 for identifying component placement and connections (based on the traces on the board 110).

The logic 104 has now differentiated a set of components 250 and their types, and a set of identifying labels 260, or designators, each corresponding to a particular component 250 on the board. The logic 104 matches each circuit component 250 with an identifying label 260 having the least distance based on a distance function for computing a distance between each available pair of circuit components and identifying labels. Often, a designator is somewhat adjacent the corresponding component, however on a crowded PCB, a given designator may appear to be visibly adjacent to multiple components. For this, the distance function is invoked, wherein matching further includes: combining, for each circuit component 250 and each identifying label 260, a set of pairs 270 denoting each circuit component with each possible identifying label The logic 104 computes, for each pair in the set of pairs 270, a distance 272 indicative of a likelihood that the respective circuit component 250 corresponds with the identifying label 260 of the pair. The logic 104 concludes, for the pair 270 having the lowest distance D1 . . . . D4 from the circuit component to the paired identifying label, that the identifying label 260 describes the circuit component 250, and hence the position on the board 110.

The computed least distance 272 indicates the most likely component 250 corresponding to each designator label 260. The logic 104 matches the identified objects 212 with a corresponding label 260 to yield the component 250 matching the label 260. In a distance table 273, the "XYZ" IC component is determined to have a least distance to D1, thus IC 250-1 corresponds to designator "U2." Resistor 250-2 has a least distance to designator R1, based on D4. The list of materials can then be assembled from the entries depicting the least distance, for each circuit component 250 the computed type of the circuit component, to the respective label 260.

Figure 3:
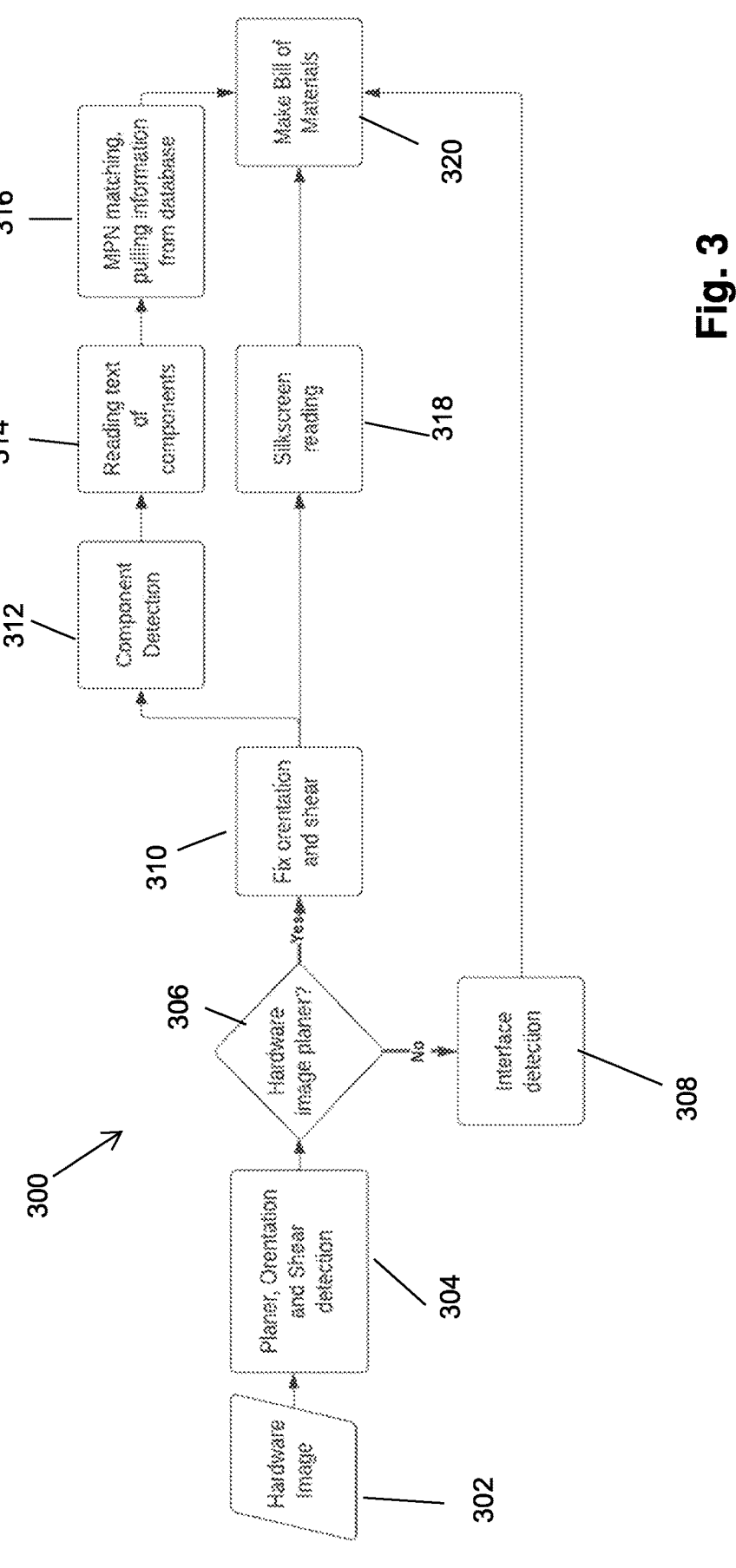
FIG. 3 is a process flow of image processing of a PCB (Printed Circuit Board) according to the data flow of FIG. 2.
Figure 4:
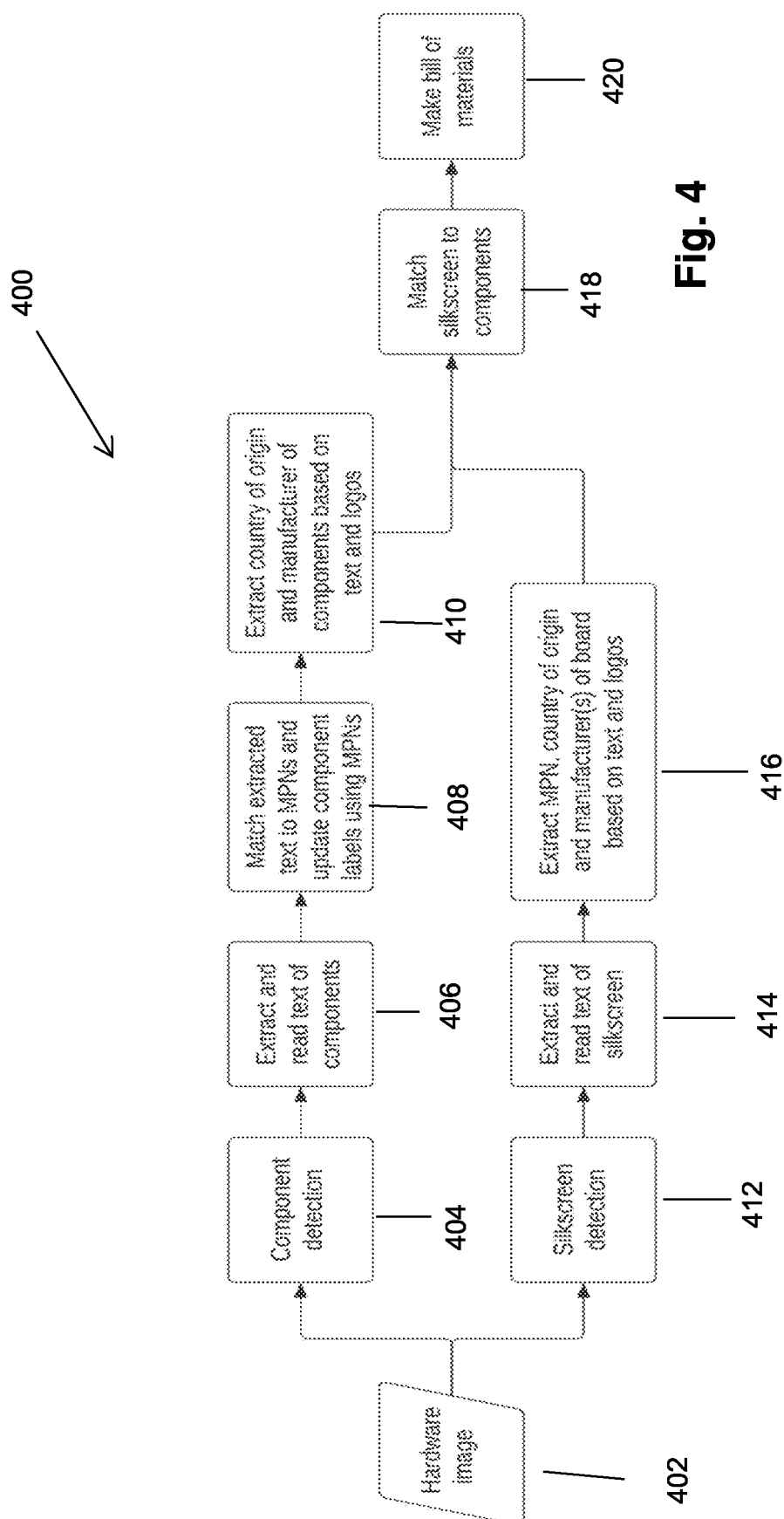
FIG. 4 is a process flow of circuit element analysis from the image taken in FIGS. 1-3.

FIGS. 3 and 4 show processing at the board and component level, respectively. FIG. 3 is a process flow 300, or pipeline, of image processing of a PCB according to the data flow of FIG. 2. Referring to FIGS. 1-3, the server 102 receives the photographic representation of a printed circuit board (PCB) as the image 108, as depicted at step 302. The image 108 is then rotated and sheared so it is square with the frame, as depicted at step 304. Since PCBs typically arrange components and designators according to a two dimensional orientation, this assures consistent matching with component visual features and alphanumeric text. The rotation and shear may be estimated by a machine-learning model. A check is performed, at step 306, for determining the planar (flat) orientation of the PCB. PCBs often employ interface connections such as pinouts, jacks and card receptacles for receiving connections to other boards, cables and external connections. The image 108 is analyzed to identify the objects from circuit elements attached to a planar surface of the PCB and having a height above the surface of the PCB. For any object deemed out of plane, an interface detection occurs, for components such as the jack 250-3. This may be noted on the resulting BOM 120.

The orientation and shear is corrected at step 310 so that the components are construed in a "square" orientation. Component 250 detection proceeds, as depicted at step 312. Component detection includes, for each object 212, comparing the object 212 to images of other components for determining a type of the component 250 represented by the object. 212 Text of components, such as IC labels and numeric values are read if present, at step 314. For any available alphanumeric designators and manufacturer logos or trademarks, a lookup is performed in the MPN database 112 and vendor DB 114, as depicted at step 316.

Designators 260 are read from alphanumeric features printed on the board, distinguished because the designators are outside the objects 212 identified as components 250, and are on the plane of the PCB, not raised as in textual labels on ICs. Designators 260 are most often printed during board manufacture, using silk-screening prior to soldering of components 250 as depicted at step 318. Thus, the logic 104 identifies the labels 260 based on designators rendered on the surface of the PCB. The resulting bill of materials 120 is generated from matching the components 250 to corresponding designators 260 using the distance comparison as in FIG. 3, as depicted at step 320, now describe in greater detail in FIG. 4. The reference designator 260 is a common PCB convention that unambiguously identifies the location of a component within an electrical schematic or on a printed circuit board. The reference designator usually consists of one or two letters followed by a number, e.g. R13, C1002. The number is sometimes followed by a letter, indicating that components are grouped or matched with each other, e.g. R17A, R17B. IEEE 315 (Institute of Electrical and Electronics Engineers 315) contains a list of Class Designation Letters to use for electrical and electronic assemblies. For example, the letter R is a reference prefix for the resistors of an assembly, C for capacitors, K for relays.

FIG. 4 is a process flow 400 of circuit elements from the image taken in FIGS. 1-3. Referring to FIGS. 1-4, analysis includes component 250 detection and designator interpretation based on detection of silkscreened designators printed on the PCB 110, based on the hardware image 108, as depicted at step 402. This includes, for each circuit component 250, matching the circuit component with a predetermined set of visual images of circuit components using component DB 118 and determining a type of the circuit component 250 based on a matching of visual features of the circuit component from the image with the predetermined set from the DB 118.

At step 404, component detection matches a portion of the image 108 defined by each object 212 to a predetermined ser of likely circuit components for computing a match based on a correspondence of visual features. Component detection includes extracting and reading any text on components, as disclosed at step 406. This refers to indicia on the components, within the bounds of detected objects 212, thus avoiding any confusion with the text of designators labels 260. MPN and vendor databases 112, 114 are consulted as described above, depicted at step 408. This includes, for each circuit component 250, determining if any indicia appears on the circuit component, and if so, determining textual elements in the indicia, determining any graphical designations of source, and comparing the textual elements to part numbers in the manufacturer database 112. Graphical indicia are compared to known trademarks indicative of vendors of circuit components. This lookup extracts information including country of origin, manufacturer, and other information based on text and logos on the component.

For active components such as ICs, the logic 104 extracts the text on the component 250 using a combination of object detection and optical character recognition. We attempt to match the text against a manufacturer part number (MPN) database. If an MPN is found, the component information for the BOM 120 is updated to match the MPN. The text is also checked against a database of country names and abbreviations to identify a country of origin for the component. Additionally, the logos are extracted from the component. A classification model may be employed to associate the logo with a manufacturer. So each component 250 can have an associated MPN, manufacturer, and country of origin.

Designator detection commences at step 412. The image 108 is scanned to extract and read any silkscreen text and logos on the board, as shown at step 414. For the text, optical character recognition (OCR) is employed to extract the text characters from the silkscreen. As with the components 250, a database lookup may be employed to determine the MPN and the country of origin of the board and classify the logos to give the manufacturer(s) of the board. In addition, we take the extracted text and identify reference designators, as depicted at step 416. It should be noted that the silkscreened scanning often identifies manufacturer and part No. information, in addition to the designators described above.

The component 250 information and designator 260 information is employed to match the silk screening to components, as disclosed at step 418, to associate the reference designators with the components. For each component-reference designator pair, we assign a score on how likely they are to be connected. The score is a weighted score of the distance between the component and reference designator and whether the component is usually associated with a reference designator of that form. For example, integrated circuits are usually associated with reference designators of the form "U #" or "ICH". Each component can match one or zero reference designators and each reference designator can match one or zero components. Based on the score we perform a matching algorithm (e.g. Hungarian matching) to find the best pairing of components and reference designators.

Next, a weighting is defined between each of the components 250 and each of the reference designators, determined by labels 260. This matching and distance computation performed by the logic 104 is now described in further detail. Sunce the component detection is generated or predicted from a machine learning model we take in a dictionary of which components are sometimes misclassified as other components For example:

Integrated circuits (IC) are sometimes misclassified transistors, diodes, and inductors. Refer to this as the misclassify_list(component).

Each component 250 is associated with certain reference designators 260, for example ICs reference designators are of the form IC #, U #. Call this ref_designator_list(component).

The weight between a reference designator rd and component comp is determined from:

If rd in ref_designator_list(comp) or in the ref_designator_list of the components in misclassify_list(comp):

$$[\text{Distance between } rd \text{ and comp}] - alpha*[rd \text{ in} \\ \text{ref\_desnator\_list(comp)}]$$

Otherwise:

The Weight is infinity

Alpha is a constant. So this takes into account the distance and the weight is lowered if it corresponds to the component itself, as opposed to one of the reference designators that the component is sometimes misclassified as.

The weight of infinity ensures that reference designators do not get matched with a component that is implausible. For example, a resistor reference designator does not get matched with an IC.

The weights apply to a matching algorithm to find the matching with the least amount of weight between matches. In an example configuration, a modified Hungarian algorithm that allows for some of the components and reference designators not to get matched. This is to avoid the case where the best matching is to match a component and a reference designator from across the board, such as when a designator is missing or cannot be interpreted.

From the matching of components 250 to designators (labels 260) having the least distance, the BOM 120 is created, as depicted at step 420, as shown from the matching pairs as in FIG. 3.

In the case that a reference designator matches a component where the reference designator is not in ref_desnator_list(component). The component label is updated. For example, if the reference designator "U3" matches with a component labeled transistor the component is updated to the label of IC.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for analyzing a circuit representation for generating a list of materials thereon, comprising:
   receiving an image of a circuit on a circuit board;
   scanning the image for identifying objects indicative of circuit components based on an indicia on the respective component;
   scanning the image for identifying labels of the circuit components printed on the circuit board;
   matching the identified objects with a corresponding label;
   generating the list of materials including a set of entries having, for each circuit component of the circuit components, a type of the circuit component and the respective corresponding label; and
   rendering the generated list of materials.

2. The method of claim 1 further comprising:
   for each object, identifying a position and an area, the area indicative of a region occupied by the circuit component and the position indicative of a location of the region relative to regions corresponding to other components.

3. The method of claim 1 further comprising, for each object, comparing the object to images of other components for determining a type of the component represented by the object.

4. The method of claim 3 further comprising matching a portion of the image defined by the object to a predetermined set of likely circuit components for computing a match based on a correspondence of visual features.

5. The method of claim 1 further comprising, for each circuit component,
   matching the circuit component with a predetermined set of visual images of circuit components, and
   determining a type of the circuit component based on a matching of visual features of the circuit component from the image with the predetermined set.

6. The method of claim 1 further comprising
   receiving a photographic representation of a printed circuit board (PCB) as the image, and identifying the objects from circuit elements attached to a planar surface of the PCB and having a height above the surface of the PCB; and identifying the labels based on designators rendered on the surface of the PCB.

7. The method of claim 1 wherein matching further comprises:

combining, for each circuit component and each identifying label, a set of pairs denoting each circuit component with each possible identifying label;

computing, for each pair in the set of pairs, a distance indicative of a likelihood that the respective circuit component corresponds with the identifying label of the pair; and concluding, for the pair having the lowest distance from the circuit component to the paired identifying label, that the identifying label describes the circuit component.

8. The method of claim 7 further comprising:

matching each circuit component with an identifying label having the least distance based on a distance function for computing a distance between each available pair of circuit components and identifying labels.

9. The method of claim 1 further comprising, for each circuit component, determining if any indicia appears on the circuit component, and if so, determining textual elements in the indicia, and determining any graphical designations of source; and comparing the textual elements to part numbers in a manufacturer database; and comparing the graphical designation to known trademarks indicative of vendors of circuit components.

10. The method of claim 1, further comprising:

detecting, for each circuit component, an area on a circuit board occupied by the respective circuit components;

detecting, in the image, textual representations; and determining whether the textual representations are designators based on whether they appear in the area occupied by a circuit component.

11. The method of claim 9, further comprising:

determining, based on at least one of the part number and the graphical designation, a country of manufacture, a vendor, a cost, and a description.

12. A circuit analysis server device, comprising an interface to a camera for receiving an image of a circuit on a circuit board;

application logic configured to:

scan the image for identifying objects indicative of circuit components based on an indicia on the respective component;

scan the image for identifying labels of the circuit components printed on the circuit board;

match the identified objects with a corresponding label; and generate the list of materials including a set of entries having, for each circuit component of the circuit components, a type of the circuit component and the respective corresponding label; and an interface to a rendering device for rendering the generated list of materials.

13. The device of claim 12, wherein the application logic is further configured to, for each object, identify a position and an area, the area indicative of a region occupied by the circuit component and the position indicative of a location of the region relative to regions corresponding to other components.

14. The device of claim 12 wherein the application logic is further configured to, for each object, compare the object to images of other components for determining a type of the component represented by the object.

15. The device of claim 14 further comprising an interface to a component repository, the component repository containing images of circuit components for matching a portion of the image defined by the object to a predetermined ser of likely circuit components for computing a match based on a correspondence of visual features.

16. The device of claim 12 further comprising:

receiving a photographic representation of a printed circuit board (PCB) as the image, and identifying the objects from circuit elements attached to a planar surface of the PCB and having a height above the surface of the PCB; and identifying the labels based on designators rendered on the surface of the PCB.

17. The device of claim 12 further comprising a matching table, the matching table configured to store entries for combining, for each circuit component and each identifying label, a set of pairs denoting each circuit component with each possible identifying label, the logic further configured to:

compute, for each pair in the set of pairs, a distance indicative of a likelihood that the respective circuit component corresponds with the identifying label of the pair; and conclude, for the pair having the lowest distance from the circuit component to the paired identifying label, that the identifying label describes the circuit component.

18. The device of claim 12 further comprising:

matching each circuit component with an identifying label having the least distance based on a distance function for computing a distance between each available pair of circuit components and identifying labels.

19. The device of claim 12 further comprising an interface to a manufacturer database, the application logic further configured to, for each circuit component, determine if any indicia appears on the circuit component, and if so, determine textual elements in the indicia, and determine any graphical designations of source; and compare the textual elements to part numbers in a manufacturer database; and compare the graphical designation to known trademarks indicative of vendors of circuit components.

20. A computer program embodying program code on a non-transitory medium that, when executed by a processor, performs steps for implementing a method for analyzing a circuit representation for generating a list of materials thereon, the method comprising:

receiving an image of a circuit on a circuit board;

scanning the image for identifying objects indicative of circuit components based on an indicia on the respective component;

scanning the image for identifying labels of the circuit components printed on the circuit board;

matching the identified objects with a corresponding label;

generating the list of materials including a set of entries having, for each circuit component of the circuit components, a type of the circuit component and the respective corresponding label; and rendering the generated list of materials.

* * * * *